United States Patent [19]

Graf et al.

[11] Patent Number: 4,861,536

[45] Date of Patent: Aug. 29, 1989

[54] METHOD FOR MANUFACTURING A SEALING RING

[75] Inventors: Gunter Graf, Weinheim; Heinz Gross, Birkenau; Stefan Sponagel, Rimbach, all of Fed. Rep. of Germany

[73] Assignee: Firma Carl Freudenberg, Weinheim, Fed. Rep. of Germany

[21] Appl. No.: 62,476

[22] Filed: Jun. 12, 1987

[30] Foreign Application Priority Data

Jun. 25, 1986 [DE] Fed. Rep. of Germany ....... 3621242

[51] Int. Cl.$^4$ .................. B29C 57/00; F16J 15/00
[52] U.S. Cl. .................. 264/108; 264/150; 264/174; 264/209.2; 264/209.3; 264/210.6; 264/210.1; 264/209.8; 264/292; 264/294; 264/299; 264/310; 264/339
[58] Field of Search .................. 264/150, 209.2, 249, 264/177.16, 177.14, 108, 174, 209.3, 209.8, 210.1, 210.6, 292, 294, 299, 310, 339

[56] References Cited

U.S. PATENT DOCUMENTS 3,404,203 10/1968 Donald .................. 264/209.2

4,672,733 6/1987 Schmitt .................. 264/262

FOREIGN PATENT DOCUMENTS 2406821 11/1974 Fed. Rep. of Germany .................. 264/177.16

Primary Examiner—Hubert Lorin
Attorney, Agent, or Firm—Kenyon & Kenyon

[57] ABSTRACT

A method for manufacture of a sealing ring with a flanged sealing lip having hydrodynamically acting return transport properties in which a sealing lip is first generated by extrusion of a plastically deformable material through a ring nozzle having rotating inner and outer surfaces which are rotated relative to each other to impart a helical motion to the extruded material; the hydrodynamically acting return transport properties being a microscopically fine pleating of the surface of the extruded hollow cylinder. The extruded cylinder is then solidified and cut to a predetermined length. The cylinder is then widened in the radial direction at its front end by an assembly tool which shapes the cylinder into a trumpet-shaped sealing ring with a flanged sealing lip.

7 Claims, 1 Drawing Sheet

METHOD FOR MANUFACTURING A SEALING RING

BACKGROUND OF THE INVENTION

1. Field of the Invention

This invention relates to a method for manufacturing a sealing ring with a sealing lip, in which the material forming the sealing lip is extruded in a plastically deformable condition through a ring nozzle and is cut to length before or after solidification, thereby forming a hose-shaped sleeve. The sealing lip of the sealing ring is provided, in the vicinity of the zone causing the dynamic seal in the completed sealing ring, with hydrodynamically-acting return-transport properties. The sleeve is slipped onto a shaped tool which continuously widens the diameter of the sealing ring and having a flanged sealing lip.

2. The Prior Art

German Patent No. 32 46 152 discloses the manufacture of a sealing ring having a sealing lip with hydrodynamically-acting return transport properties. These properties are generated in the sealing lip of that reference after the solidification of the material forming the sealing lip and such generation requires a separate operating step. Hydrodynamically-acting return transport properties have also been generated in the sealing lips of sealing rings of the prior art by chip removal or by perpendicular pressure on the surface of sealing lips by an embossing tool. The need exists, however, for a method of manufacturing a sealing lip with a sealing ring having hydrodynamically-acting return transport properties which does not require a separate operating step to impart those hydynamically-acting return transport properties to the sealing lip of the sealing ring. The need also exists for a method of manufacturing a sealing ring having a sealing lip with hydrodynamically-acting return transport properties which is completely leakage free. Further, the need exists for a method of manufacturing a sealing ring with a sealing lip having hydrodynamically-acting return transport properties which has an increased service life and an improved resistance to abrasion.

It is therefore an object of the present invention to provide a method for manufacturing a sealing ring with a sealing lip having hydynamically-acting return transport properties which does not require a separate operating step to impart the hydrodynamically-acting return transport properties to the sealing lip during extrusion of the sealing ring.

It is a further object of the present invention to provide a method for manufacturing a sealing ring with a sealing lip having hydrodynamically-acting return transport properties which is completely leakage free.

It is a still further object of the present invention to provide a method for manufacturing a sealing ring with a sealing lip having hydrodynamically-acting return transport properties which has an increased service life and an improved resistance to abrasion.

Other objects and advantages of the present invention will be in part obvious and in part hereinafter pointed out.

SUMMARY OF THE INVENTION

In accordance with the above-stated objects, a method for manufacturing a sealing ring with a sealing lip having hydrodynamically-acting return transport properties is disclosed in which a plastically deformable material is extruded through a ring nozzle which has in the vicinity of its exit inner and outer surfaces which rotate relative to one another and which thereby generate a helical flow of the plastically-deformable sealing material. This relative rotation of the surfaces bounding the exit slot of the ring nozzle generates the hydrodynamically-acting return transport properties in the plastically-deformable sealing material by causing a particular orientation of the molecular structure of the extruded plastically-deformable sealing material upon solidification of that material subsequent to extrusion. A cylindrical sleeve of the extruded sealing material is then cut to a predetermined length and inserted into a tool which gradually widens one end of the sealing ring into a trumpet-like shape and which further provides that widened end of the sealing ring with a flanged lip having the aforementioned hydrodynamically-acting return-transport properties.

It has been discovered that sealing rings manufactured in accordance with the present invention have a substantially improved service life and a significantly improved resistance to abrasion. This resistance to abrasion can be further enhanced by the extrusion, solidification and shaping of a sealing material comprised in part of short fibers in accordance with the method of the present invention. These short fibers, like the molecular chains of the aforementioned plastically deformable sealing material, are preferentially aligned as a result of the helical extrusion of the sealing material through the exit slot of the ring nozzle having rotating inner and outer surfaces. Upon solidification, these short fibers are embedded in a stretched-out form with the molecular chains of the sealing material and contribute to a significant enhancement of the resistance of a sealing lip formed from such a material to abrasion. These short fibers can consist of metallic fibers, synthetic fibers and/or natural fibers. It has been discovered that short metallic fibers provide the greatest increase of resistance to abrasion. The short fibers have a lesser resistance to abrasion than the sealing material in which they are enclosed. During the natural wear which occurs in the region of the sealing lip during use of the sealing ring, a preferred separation of these fiber components tangential to the surface of the sealing lip occurs, thereby forming lubrication pockets within the sealing lip. The formation of these lubrication pockets greatly increases the resistance of the sealing lip to wear.

DETAILED DESCRIPTION OF A PREFERRED EMBODIMENT

Figure 1:
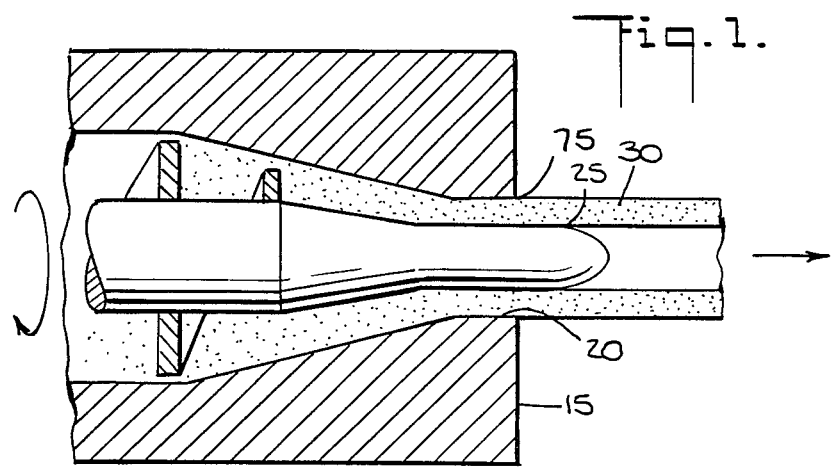
FIG. 1 is a cross-sectional view of an extruding head employed in the method of the present invention.

As illustrated in the cross-sectional view of FIG. 1 an extruding head 15 has an inner surface 25 and an outer surface 20 which rotate relative to each other in the vicinity of the exit slot of the ring nozzle 75 thereby causing a helical flow of sealing material 30 as it is extruded through the ring nozzle 75. Where the boundary surfaces of the ring nozzle are smooth, a microscopically fine pleating of the surface of the extruded material 30 occurs and the angle of this pleating relative to the exit direction of the extruded material 30 from the ring nozzle 75 is a function of the output velocity of the extruded material from the ring nozzle as well as the relative rotational velocities of inner surface 25 and outer surface 20.

Figure 2:
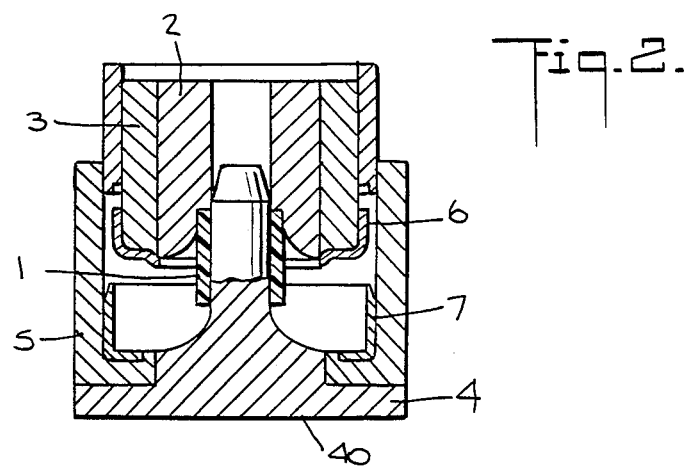
FIG. 2 is a cross-sectional view of an assembly tool used in the method of the present invention in which the upper portion of the assembly tool is in a first, open, position relative to the lower portion of the assembly tool.
Figure 3:
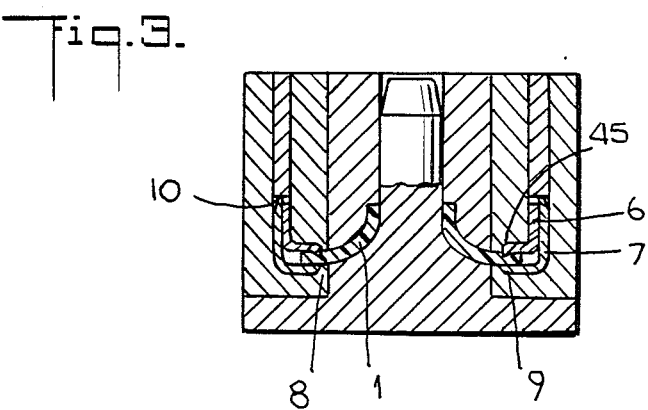
FIG. 3 is a cross-sectional view of an assembly tool used in the method of the present invention in which the upper portion of the assembly tool is in a second, closed, position relative to the lower portion of the assembly tool.

The plastically deformable sealing material 30 extruded from the ring nozzle 75 of the extruding head 15 is then solidified and cut into a cylindrical hollow cylinder 1 of a predetermined length. These cylindrical hollow cylinders 1 are then inserted into the lower tool part 4 of assembly tool 40 as illustrated in FIG. 2. Assembly tool 40 comprises an upper tool part 2 with a lock 3 which can be advanced in a time sequence, and a lower tool part 4 with an ejector 5 which can be moved independently thereof. Lock 3 supports loosely slipped-on inner ring 6. Stiffening ring 7 is receivably positioned on ejector 5 relative to inner ring 6. Upon insertion of the hollow cylindrical section 1 onto lower tool part 4, upper tool part 2 moves downwardly and coaxially relative to lower tool part 4 and thereby depresses cylinder 1 as the upper tool part moves from an open position illustrated in FIG. 2 to a closed position illustrated in FIG. 3. The lower end of cylinder 1 is thereby shaped into a trumpet-like configuration as a result of the compression of cylinder 1 against lower tool part 4 caused by the axial rotation and translation of upper tool part 2.

A flange 9 is formed at the lip of the compressed end of cylinder 1 as a result of the compression of cylinder 1 against stiffening ring 7 caused by the rotating downward movement of upper tool part 2 relative to lower tool part 4. Lock 3 then rotates downwardly relative to lower tool part 4 and upper tool part 2, thereby causing the radially inwardly pointing portion 45 of inner ring 6 to axially compress flange 9 of cylinder 1 against stiffening ring 7 thereby upwardly bending to crimp the segment of flange 9 compressed between inner ring 6 and stiffening ring 7. Assembly tool 40 can then be opened and the manufactured sealing ring with a flanged sealing lip can then be removed. The flanged sealing lip of a sealing ring manufactured in accordance with the present invention has a microscopically fine pleating at an acute angle relative to the axial direction of the sealing ring.

It is understood that the invention is not limited to the illustrations described and shown herein, which are deemed to be merely illustrative of the best modes of carrying out the invention. The invention also encompass all such modifications which are within the scope of the following claims.

What is claimed is:

1. A method for manufacturing a sealing ring with a sealing lip having hydrodynamically-acting return transport properties, comprising the steps of:
    extruding a plastically deformable material through a ring nozzle having an exit slot, the extruded plastically deformable material having a surface;
    causing helical flow of said plastically deformable material at said exit slot thereby generating hydrodynamically acting return transport properties in the surface of the plastically deformable material during extrusion thereof prior to solidification after said extruding, said hydrodynamically acting return transport properties being a microscopically fine pleating of the surface of the extruded material;
    solidifying the extruded material with the hydrodynamically acting return transport properties;
    cutting the solidified extruded material to a predetermined length thereby forming a hose-shaped sleeve;
    axially inserting the sleeve onto one end of a shaped piece having at an opposite end a continuously increasing diameter and terminating in a stiffening ring at the opposite end; and
    pushing the sleeve along the shaped piece towards the opposite end thereof so that the shaped piece and the stiffening ring cooperate to form a flange at a lip of the sleeve.

2. The method of claim 1 wherein the step of causing helical flow comprises the step of relatively rotating inner and outer surfaces of the exit slot of the ring nozzle.

3. A method according to claim 1 wherein said material to be extruded contains short fibers and said helical flow causes said fibers to be preferentially aligned in a stretched-out configuration.

4. A method for manufacturing a sealing ring having hydrodynamically acting return transport properties, comprising the steps of:
    extruding a hollow cylinder of plastically deformable material through a ring nozzle having an exit slot, said extruded hollow cylinder having a surface;
    relatively rotating inner and outer surfaces of the ring nozzle at said exit slot during extrusion of the plastically deformable material thereby imparting a helical motion to the extruded material and thereby generating hydrodynamically acting return transport properties in the surface of the extruded hollow cylinder of plastically deformable material prior to solidification after said extruding, said hydrodynamically acting return transport properties being a microscopically fine pleating of the surface of the extruded hollow cylinder;
    solidifying the extruded cylinder;
    cutting the extruded cylinder to a predetermined length; and
    shaping the cylinder into a sealing ring having a trumpet-shaped end with a flanged lip.

5. The method of claim 4 wherein said step of shaping comprises the steps of:
    disposing the cut cylinder on one end of a first shaped piece having at an opposite end a continuously increasing diameter and terminating in a stiffening ring at the opposite end;
    pressing a second shaped piece against the cylinder to force same along the first shaped piece to widen one end of said cylinder; and
    crimping the widened end of said cylinder by pressing said widened end between the stiffening ring and a third shaped piece coaxial with the second shaped piece.

6. The method of claim 5, further comprising the step of rotating the first shaped piece and the second shaped piece relative to one another.

7. A method according to claim 4 wherein said material to be extruded contains short fibers and said helical flow causes said fibers to be preferentially aligned in a stretched-out configuration.

* * * * *

UNITED STATES PATENT AND TRADEMARK OFFICE
CERTIFICATE OF CORRECTION

PATENT NO. : 4,861,536
DATED : August 29, 1989
INVENTOR(S) : Günter Graf et al

It is certified that error appears in the above-identified patent and that said Letters Patent is hereby corrected as shown below:

Column 1, line 17, "sealing ring and having"

should read

-- sealing ring and thereby shapes the sealing ring into a trumpet-like shape having--

Signed and Sealed this

Seventh Day of August, 1990

Attest:

HARRY F. MANBECK, JR.

*Attesting Officer*     *Commissioner of Patents and Trademarks*